(12) United States Patent
Lee

(10) Patent No.: US 12,467,600 B2
(45) Date of Patent: Nov. 11, 2025

(54) OPTICAL MODULE AND LAMP FOR VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/665,686

(22) Filed: May 16, 2024

(65) Prior Publication Data

US 2025/0020300 A1 Jan. 16, 2025

(30) Foreign Application Priority Data

Jul. 10, 2023 (KR) .................. 10-2023-0089159

(51) Int. Cl.
*F21S 41/20* (2018.01)
*B60Q 1/00* (2006.01)
(Continued)

(52) U.S. Cl.
CPC ............ *F21S 41/285* (2018.01); *F21V 5/004* (2013.01); *F21V 5/008* (2013.01); *B60Q 1/0029* (2013.01); *B60Q 1/0035* (2013.01); *B60Q 1/0041* (2013.01); *B60Q 1/0047* (2013.01); *B60Q 1/0058* (2013.01); *F21S 41/147* (2018.01); *F21S 41/265* (2018.01); *F21Y 2113/00* (2013.01); *G02B 3/0037* (2013.01);
(Continued)

(58) Field of Classification Search
CPC .... F21S 41/147; F21S 41/265; G02B 3/0037; G02B 3/0043; G02B 3/005; G02B 3/0056; G02B 3/0062; G02B 3/0068; G02B 3/0075; B60Q 1/0029; B60Q 1/0035; B60Q 1/0041; B60Q 1/0047; B60Q 1/0058
See application file for complete search history.

(56) References Cited

U.S. PATENT DOCUMENTS 10,232,763 B1 * 3/2019 Eckstein ............ G02B 19/0066
10,962,191 B1 * 3/2021 Go ........................ F21S 41/255
(Continued)

FOREIGN PATENT DOCUMENTS

WO WO-2015058227 A1 * 4/2015 .............. F21S 41/00
WO WO-2024136235 A1 * 6/2024 ............. F21S 41/265

OTHER PUBLICATIONS

Machine translation of WO 2015058227 A1 retrieved from the FIT database of PE2E search. (Year: 2025).*
(Continued)

*Primary Examiner* — Colin J Cattanach
(74) *Attorney, Agent, or Firm* — NovoTechIP International PLLC

(57) ABSTRACT

An optical module includes a light source that outputs light, and a micro lens array (MLA) module provided on a front side of the light source, and to which the light is input. The MLA module includes an input lens array, to which the light is input, and includes a plurality of input lenses. An output lens array provided on a front side of the input lens array, that outputs the light input from the input lens array includes a plurality of output lenses, where optical axes of the plurality of output lenses extend in a forward/rearward direction and cross centers of the plurality of input lenses.

7 Claims, 16 Drawing Sheets

(51) Int. Cl.
  *F21S 41/147*    (2018.01)
  *F21S 41/265*    (2018.01)
  *F21V 5/00*    (2018.01)
  *F21Y 113/00*    (2016.01)
  *G02B 3/00*    (2006.01)

(52) U.S. Cl.
  CPC ............ *G02B 3/0043* (2013.01); *G02B 3/005* (2013.01); *G02B 3/0056* (2013.01); *G02B 3/0062* (2013.01); *G02B 3/0068* (2013.01); *G02B 3/0075* (2013.01)

(56) References Cited

U.S. PATENT DOCUMENTS

2018/0335191 A1*  11/2018  Stefanov ............... F21S 41/143
2020/0207257 A1*   7/2020  Choi .................... B60Q 11/007
2020/0386382 A1*  12/2020  Choi ...................... F21S 41/40
2021/0381673 A1*  12/2021  Lee ......................... F21V 5/004
2022/0034465 A1*   2/2022  Lee ......................... F21V 5/004
2022/0373154 A1*  11/2022  Go ......................... F21S 41/143

OTHER PUBLICATIONS

Machine translation of WO 2024136235 A1 retrieved from the FIT database of PE2E search. (Year: 2025).*

* cited by examiner

OPTICAL MODULE AND LAMP FOR VEHICLE INCLUDING THE SAME

CROSS-REFERENCE TO RELATED APPLICATIONS

This application claims the benefit of priority to Korean Patent Application No. 10-2023-0089159, filed in the Korean Intellectual Property Office on Jul. 10, 2023, the entire contents of which are incorporated herein by reference.

TECHNICAL FIELD

The present disclosure relates to an optical module, and a lamp for a vehicle including the same.

BACKGROUND

In general, a micro lens array including a plurality of micro lenses are widely used in a fine optical field, such as optical communication or direct optical imaging. In recent years, lamps that may form targeted beam patterns by using micro lens arrays have been actively developed.

Conventional micro lens arrays that may form beam patterns are manufactured by separately manufacturing an input lens array, an output lens array, and a shield and then coupling them.

Because a process of separately manufacturing and coupling the components to manufacture a micro lens array is necessary, a process of manufacturing a micro lens array and a manufacturing scheme thereof become complex.

SUMMARY

The present disclosure has been made to solve the above-mentioned problems occurring in the prior art while advantages achieved by the prior art are maintained intact.

An aspect of the present disclosure provides an optical module provided with a micro lens array that may implement an adaptive driving beam (ADB) without separately including a shield through a disposition relationship of an output lens array and an input lens array.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an optical module includes a light source that outputs light, and a micro lens array (MLA) module provided on a front side of the light source, and to which the light is input, the MLA module includes an input lens array, to which the light is input, and including a plurality of input lenses, and an output lens array provided on a front side of the input lens array, that outputs the light input to the input lens array to an outside, and including a plurality of output lenses, and optical axes of the plurality of output lenses extend in a forward/rearward direction, and cross centers of the plurality of input lenses.

Furthermore, the plurality of input lenses and the plurality of output lenses may correspond to each other in a one-to-one relationship, and all of the optical axes of the plurality of output lenses may coincide with all of optical axes of the plurality of input lenses, respectively.

Furthermore, a forward/rearward width of an input surface of each of the input lenses, to which the light is input, may be the same as a forward/rearward width of an output surface of the corresponding output lens, from which the light is output.

Furthermore, the input lenses may have shapes that are convex rearwards, the output lenses may have shapes that are convex forwards, and radii of curvature of any portions of the input lenses may be the same as radii of curvature of the output lenses.

Furthermore, the any portions of the input lenses may define upper portions of the input lenses, and radii of vertical curvatures of lower sides of the input lenses may be larger than radii of vertical curvatures of the output lenses.

Furthermore, when, among the lights output from the light source, lights input to upper sides of the input lenses are defined as first lights and lights input to lower sides of the input lenses are defined as second lights, the second lights may be output from the output lens array to be inclined upwards with respect to the first lights.

Furthermore, the optical module may further include a collimator that converts the light output from the light source to parallel light and disposed between the light source and the MLA module with respect to the forward/rearward direction.

Furthermore, an optical axis of the collimator and an optical axis of the light source may coincide with each other.

Furthermore, a plurality of light sources may be provided, the plurality of light sources may include a central light source crossing an optical axis of the collimator, and from which a central light is output, a first peripheral light source disposed on one side of the central light source in a leftward/rightward direction, and from which a first peripheral light is output, and a second peripheral light source disposed on an opposite side of the central light source in the leftward/rightward direction, and from which a second peripheral light is output, and the output lens array may be configured to output the first peripheral light such that the first peripheral light is inclined to one side in the leftward/rightward direction with respect to the central light, and output the second peripheral light such that the second peripheral light is inclined to an opposite side in the leftward/rightward direction with respect to the central light.

According to another aspect of the present disclosure, a lamp for a vehicle includes a plurality of optical modules, each of the optical modules includes a light source that outputs light, and a micro lens array (MLA) module provided on a front side of the light source, and to which the light is input, the MLA module includes an input lens array, to which the light is input, and including a plurality of input lenses, and an output lens array provided on a front side of the input lens array, that outputs the light input to the input lens array to an outside, and including a plurality of output lenses, and optical axes of the plurality of output lenses extend in a forward/rearward direction, and cross centers of the plurality of input lenses, any one of the plurality of optical modules is configured such that any one of optical axes of the plurality of output lenses coincides with an optical axis of the light source, and another one of the plurality of optical modules is configured such that optical axes of the plurality of output lenses are not parallel to the optical axis of the light source.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
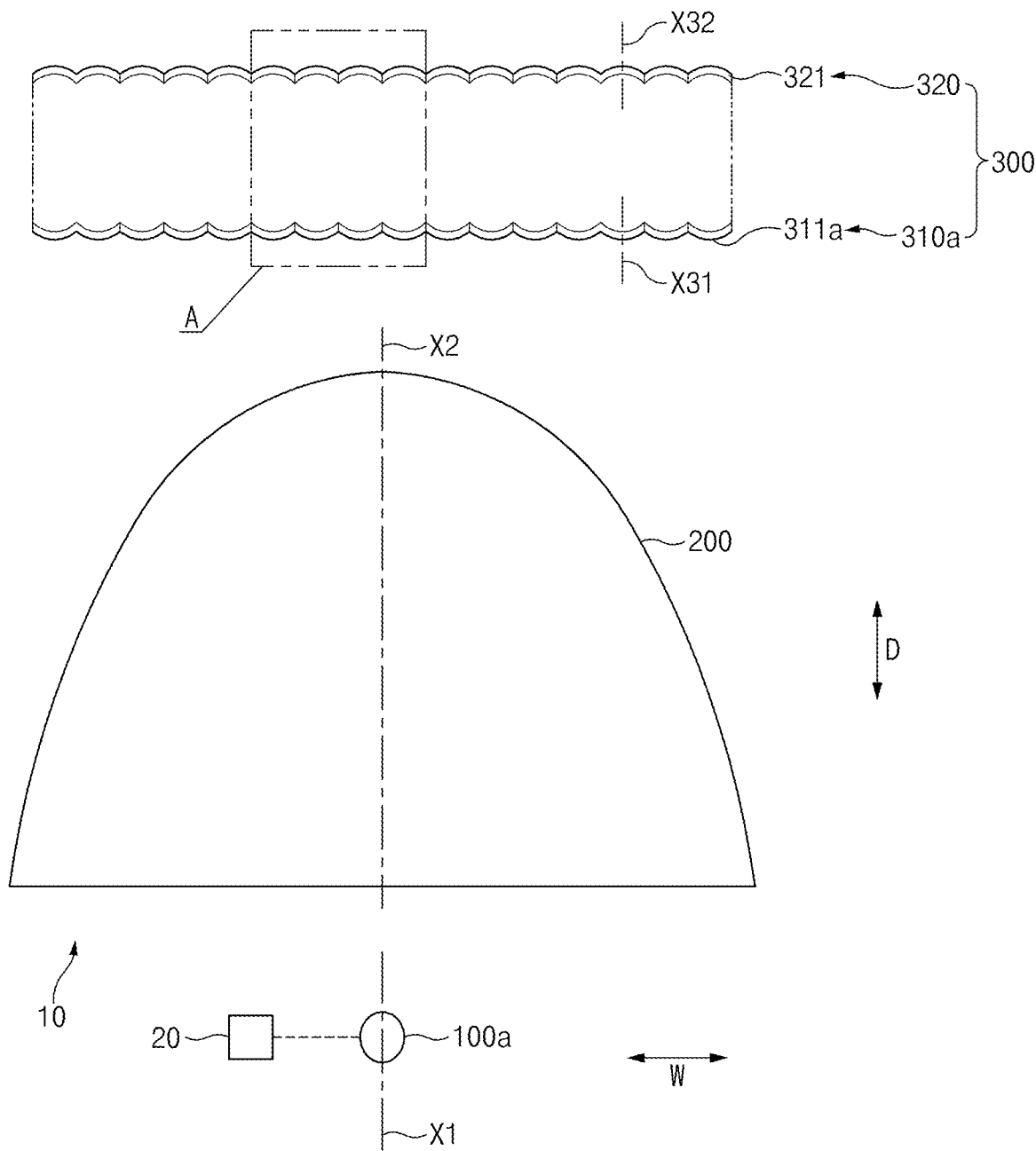
FIG. 1 is a plan view of a lamp for a vehicle according to an embodiment of the present disclosure.

Hereinafter, various embodiments of the present disclosure will be described with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. It should be understood that when it is described that a component is "input to" or "output from" another component, the former component may be directly input to or output from the latter component, but a third component may be "input" or "output" between the components.

Hereinafter, a lamp 1 (hereinafter, 'the lamp') for a vehicle according to the present disclosure will be described with reference to the drawings.

Referring to FIG. 1, a lamp 1 according to the present disclosure may be a headlamp for implementing an adaptive driving beam (ADB). The lamp 1 may be provided on a front side of a vehicle, and may secure a visibility of the user. The lamp 1 may include an optical module 10 and a controller 20.

The optical module 10 according to a first embodiment of the present disclosure may form a beam segment. The beam segment may mean a part that forms a portion of a beam pattern. In the present disclosure, the beam pattern, as an example, may mean a high-beam light distribution pattern. The optical module 10 may include a light source 100a, a collimator 200, and an MLA module 300.

The light source 100a may output light in a first direction (as an example, a forward direction). The light source 100a, for example, may be a light emitting diode (LED). However, the present disclosure is not limited to the example, and the light source 100a may be provided with various means that may output light in the first direction.

Furthermore, an optical axis of the light source 100a may be named a first optical axis X1. The first optical axis X1 may be defined as an imaginary line that passes through a center of the light source 100a and extends in the first direction (e.g., the forward direction). The light source 100a may have a shape that is symmetrical with respect to the first optical axis X1.

The collimator 200 may convert the input light to parallel light, and then, may output the light forwards. For example, the light output from the light source 100a may be input to a rear surface of the collimator 200. A rear surface of the collimator 200 may be named a light input surface of the collimator 200. The rear surface of the collimator 200 may have a shape that is convex rearwards. Furthermore, the collimator 200 may be disposed on a side of the light source 100a in the first direction (as an example, the forward direction). For example, the collimator 200 may be disposed on a front side of the light source 100a.

Furthermore, an optical axis of the collimator 200 may be named a second optical axis X2. The second optical axis X2 may be defined as an imaginary line that passes through a center of the collimator 200 and extends in the first direction (as an example, the forward direction). The collimator 200 may have a shape that is symmetrical with respect to the second optical axis X2. Furthermore, the first optical axis X1 may be parallel to the second optical axis X2. For example, the first optical axis X1 and the second optical axis X2 may coincide with each other. In other words, the first optical axis X1 and the second optical axis X2 may form the same one imaginary line.

Furthermore, the light source 100a and the collimator 200 may be named as a first optical system. In other words, the first optical system may be understood as a concept including a light source 100a and the collimator 200.

Figure 2:
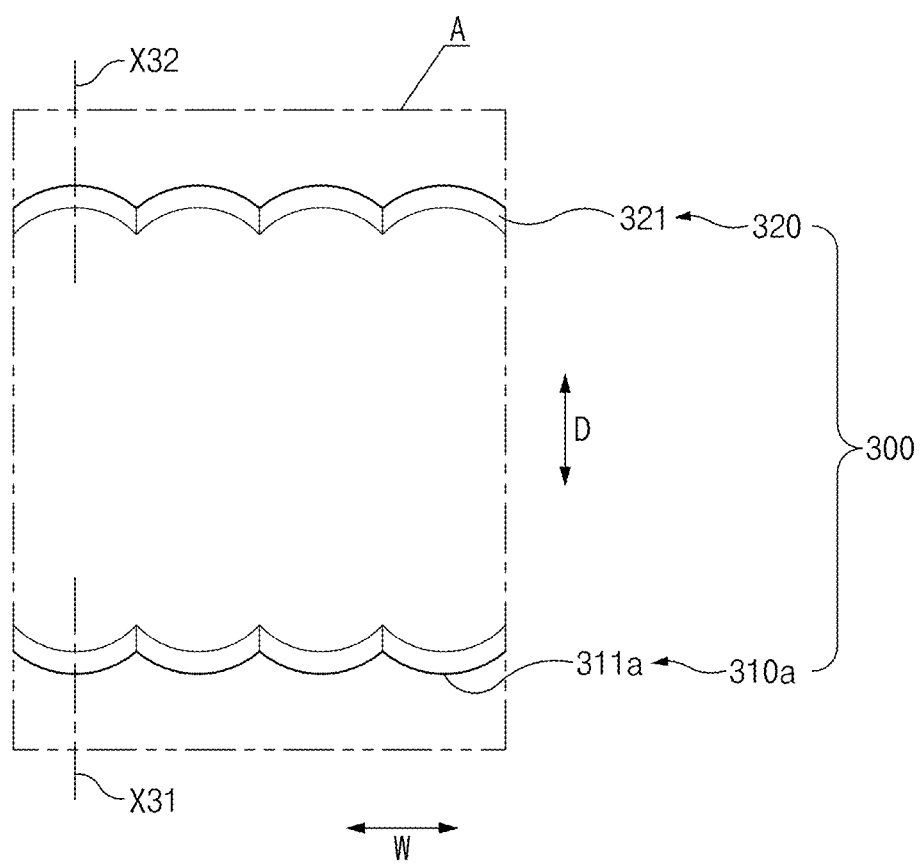
FIG. 2 is an enlarged view of "A" of FIG. 1.
Figure 3:
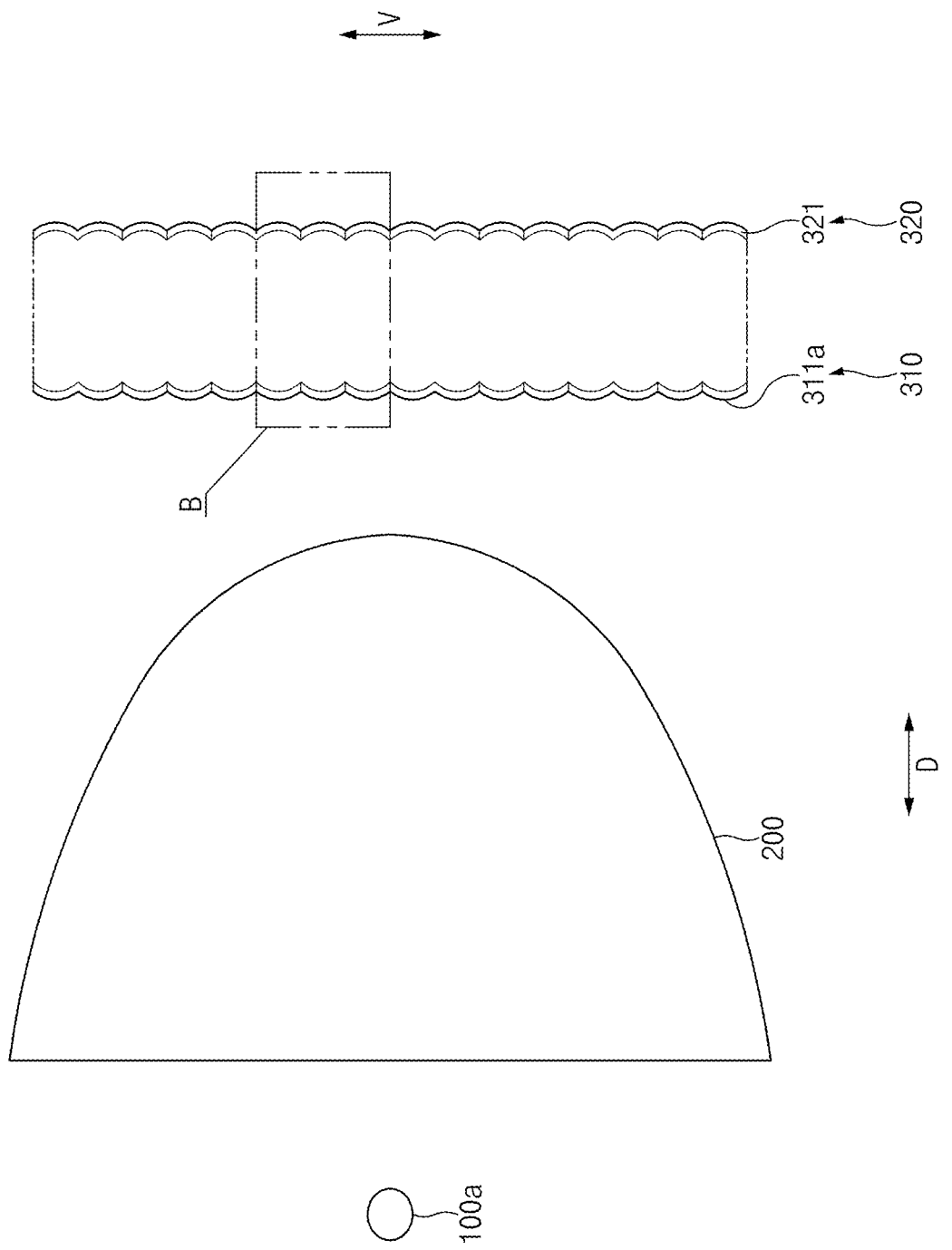
FIG. 3 is a side view of an optical module according to a first embodiment of the present disclosure.
Figure 4:
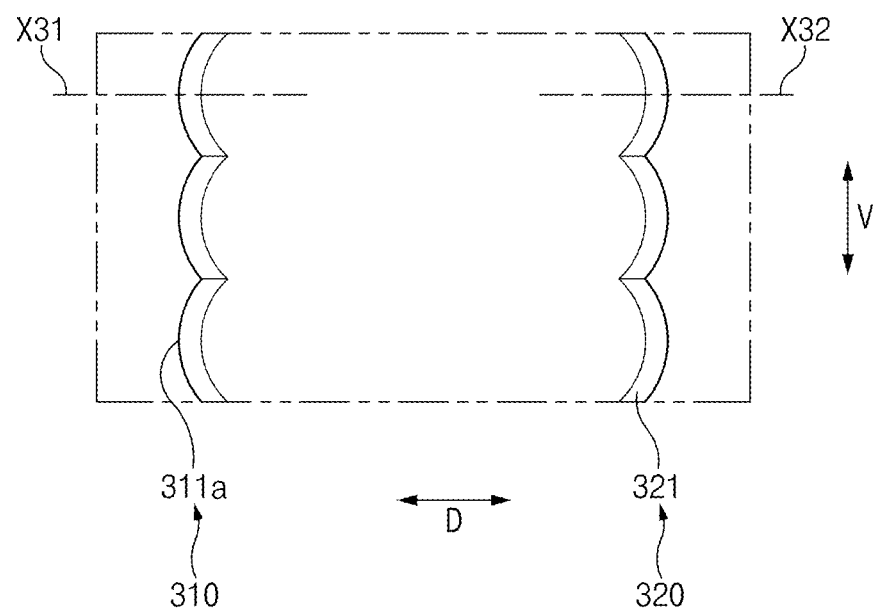
FIG. 4 is an enlarged view of "B" of FIG. 3.

Referring further to FIGS. 2 to 4, the light output from the collimator 200 may be input to the MLA module 300. The MLA module 300 may be disposed to face the collimator 200. The MLA module 300 may be disposed on a front side of the collimator 200. The MLA module 300 may include an input lens array 310a and an output lens array 320.

The light output from the collimator 200 may be input to the input lens array 310a. The input lens array 310a may define a front side of the MLA module 300. The input lens array 310a may include a plurality of input lenses 311a.

Each of the input lenses 311a may have a shape that is convex rearwards. Furthermore, the plurality of input lenses 311a, as an example, may be arranged to have a lattice pattern along a direction (a leftward/rightward direction "W" and a vertical direction "V") that is perpendicular to a forward/rearward direction "D". An optical axis of the input lens 311a may be named an input optical axis X31. The input optical axis X31 may be defined as an imaginary line that passes through a center of the input lens 311a and extends in the forward/rearward direction "D". In a more detailed example, the input optical axis X31 may be defined as an imaginary line that passes a vertical (V) center and a horizontal center of the input lens 311a.

The input lens 311a may have a shape that is symmetrical with respect to the input optical axis X31. The input lens 311a may be provided as an aspheric lens. Furthermore, a plurality of input optical axes X31 may be provided to correspond to the plurality of input lenses 311a, respectively.

The output lens array 320 may output the light input to the input lens array 310a to an outside. The output lens array 320 may define a rear side of the MLA module 300. The output lens array 320 and the input lens array 310a may be integrally formed. For example, the input lens array 310a and the output lens array 320 may be injection-molded with a single member. In other words, the MLA module 300 may be manufactured through a single injection-molding process. In this way, because the MLA module 300 according to the present disclosure may be manufactured through the single injection-molding process, complexity of conventional processes that are necessary for manufacturing and coupling several components may be solved. The output lens array 320 may include a plurality of output lenses 321.

Each of the output lenses 321 may have a shape that is convex forwards. Furthermore, the plurality of output lenses 321, as an example, may be arranged to have a lattice pattern along a direction (the leftward/rightward direction "W" and the vertical direction "V") that is perpendicular to the forward/rearward direction "D". All of the plurality of output lenses 321 may be the same single lenses.

Referring back to FIG. 2, an output lens width that is a width of the output lens 321 in the forward/rearward direction "D" may be the same as an input lens width that is a width of the input lens 311a in the forward/rearward direction "D". The input lens width may be defined as a spacing distance between a front end and a rear end of the input lens 311a. For example, the input lens width may mean a width of the input surface in the forward/rearward direction "D", which is a surface of the input lens 311a, to which the light is input.

Furthermore, the output lens width may be defined as a spacing distance between a front end and a rear end of the output lens 321. For example, the output lens width may mean a width of the output surface in the forward/rearward direction "D", which is a surface of the output lens 321, from which the light is output.

Referring back to FIGS. 3 and 4, a width of the output lens 321 in the leftward/rightward direction "W" may be the same as a width of the input lens 311a in the leftward/rightward direction "W". Furthermore, a width of the output lens 321 in the vertical direction "V" may be the same as a width of the input lens 311a in the vertical direction "V".

An optical axis of the output lens 321 may be named an output optical axis X32. The output optical axis X32 may be defined as an imaginary line that passes through a center of the output lens 321 and extends in the forward/rearward direction "D". In more detail, the output optical axis X32 may mean an imaginary line that passes through a vertical (V) center and a horizontal center of the output lens 321.

The output lens 321 may have a shape that is symmetrical with respect to the output optical axis X32. The output lens 321 may be provided as an aspheric lens. A plurality of output optical axes X32 may be provided to correspond to the plurality of output lenses 321, respectively.

The plurality of output optical axes X32 may cross centers of the plurality of input lenses 311a, respectively. Furthermore, the plurality of input lenses 311a may correspond to the plurality of output lenses 321 in a one-to-one relationship. For example, the plurality of output optical axes X32 may correspond to the plurality of input optical axes X31 in a one-to-one relationship. In a more detailed example, all of the plurality of output optical axes X32 and all of the input optical axes X31 may coincide with each other.

Furthermore, referring back to FIG. 2, a horizontal curvature of the input lens 311a and a horizontal curvature of the output lens 321 may be the same. The horizontal direction may be defined as a direction that includes the leftward/rightward direction "W" and the forward/rearward direction "D" and is perpendicular to the vertical direction "V". The horizontal direction curvature of the input lens 311a may mean a curvature that is defined by the input lens 311a when the input lens 311a is viewed in the vertical direction "V". The horizontal direction curvature of the output lens 321 may mean a curvature that is defined by the output lens 321 when the output lens 321 is viewed in the vertical direction "V".

Furthermore, referring back to FIGS. 3 and 4, a vertical (V) curvature of the input lens 311a may be the same as a vertical (V) curvature of the output lens 321. The vertical (V) curvature of the input lens 311a may mean a curvature that is defined by the input lens 311a when the input lens 311a is viewed in a horizontal direction.

Moreover, all of the vertical (V) curvature of the input lens 311a, the horizontal direction curvature of the input lens 311a, the vertical (V) curvature of the output lens 321, and the horizontal direction curvature of the output lens 321 may be the same.

Figure 5:
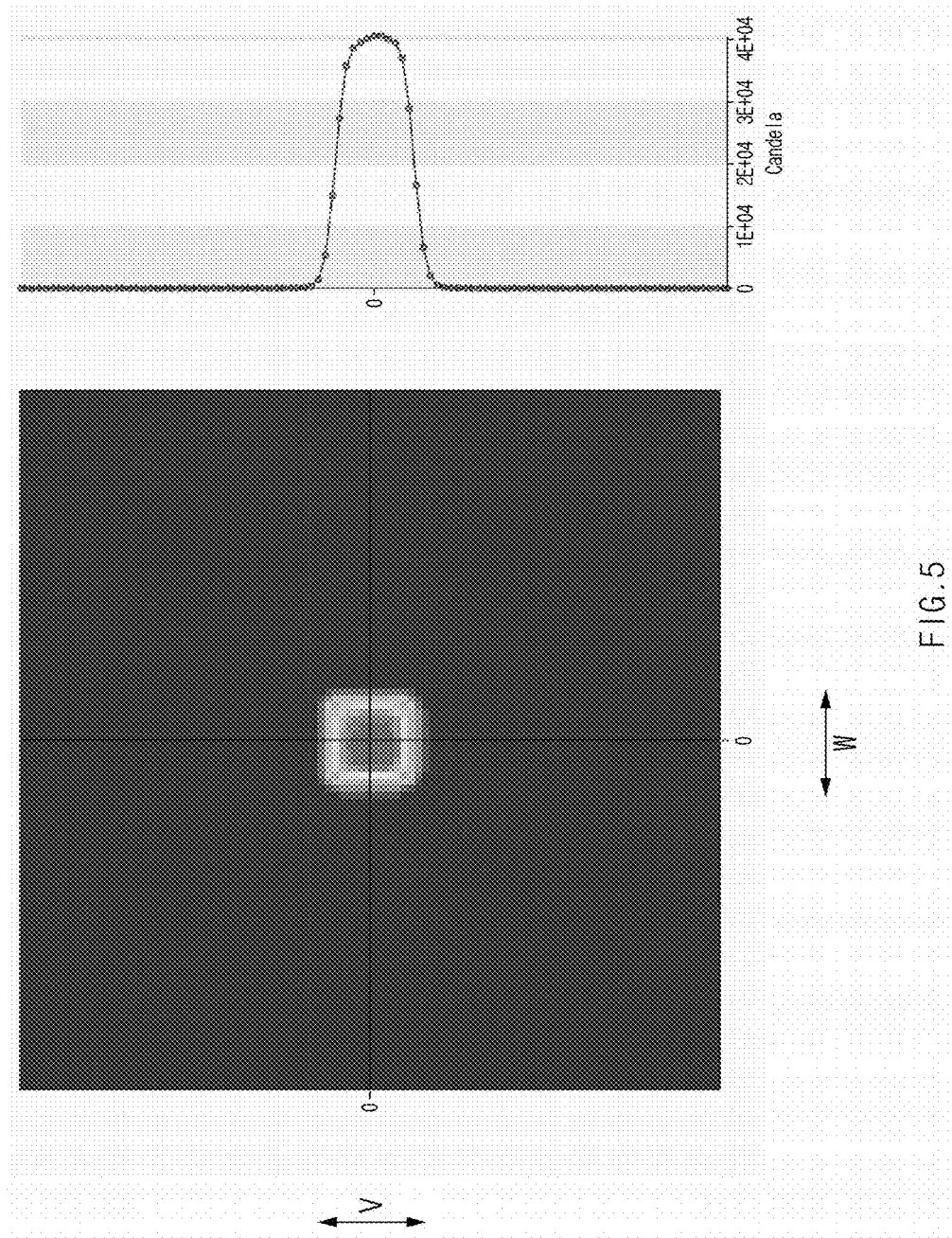
FIG. 5 is a view illustrating a beam segment formed by an optical module according to the first embodiment of the present disclosure.
Figure 6:
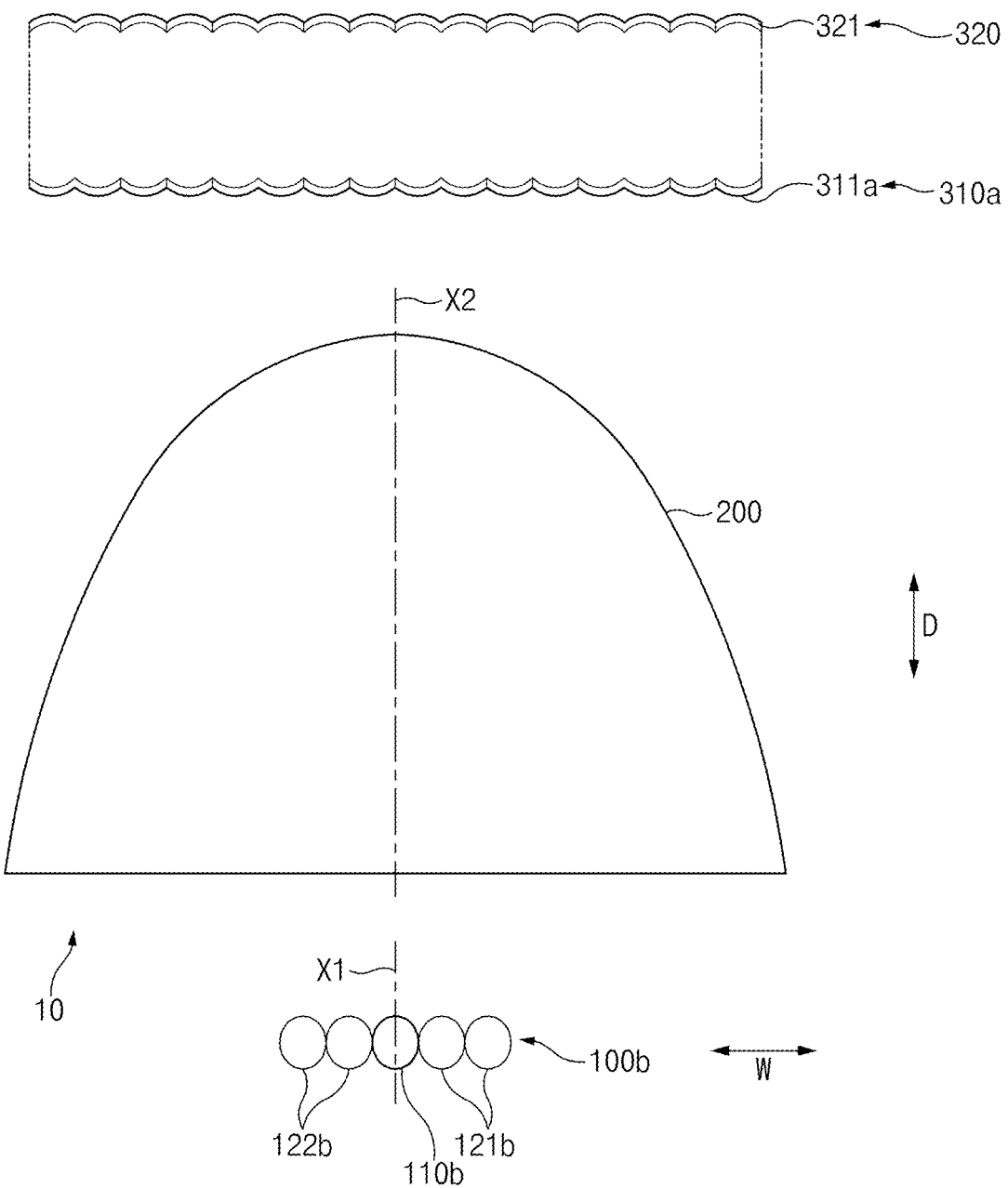
FIG. 6 is a plan view of an optical module according to a second embodiment of the present disclosure.
Figure 7:
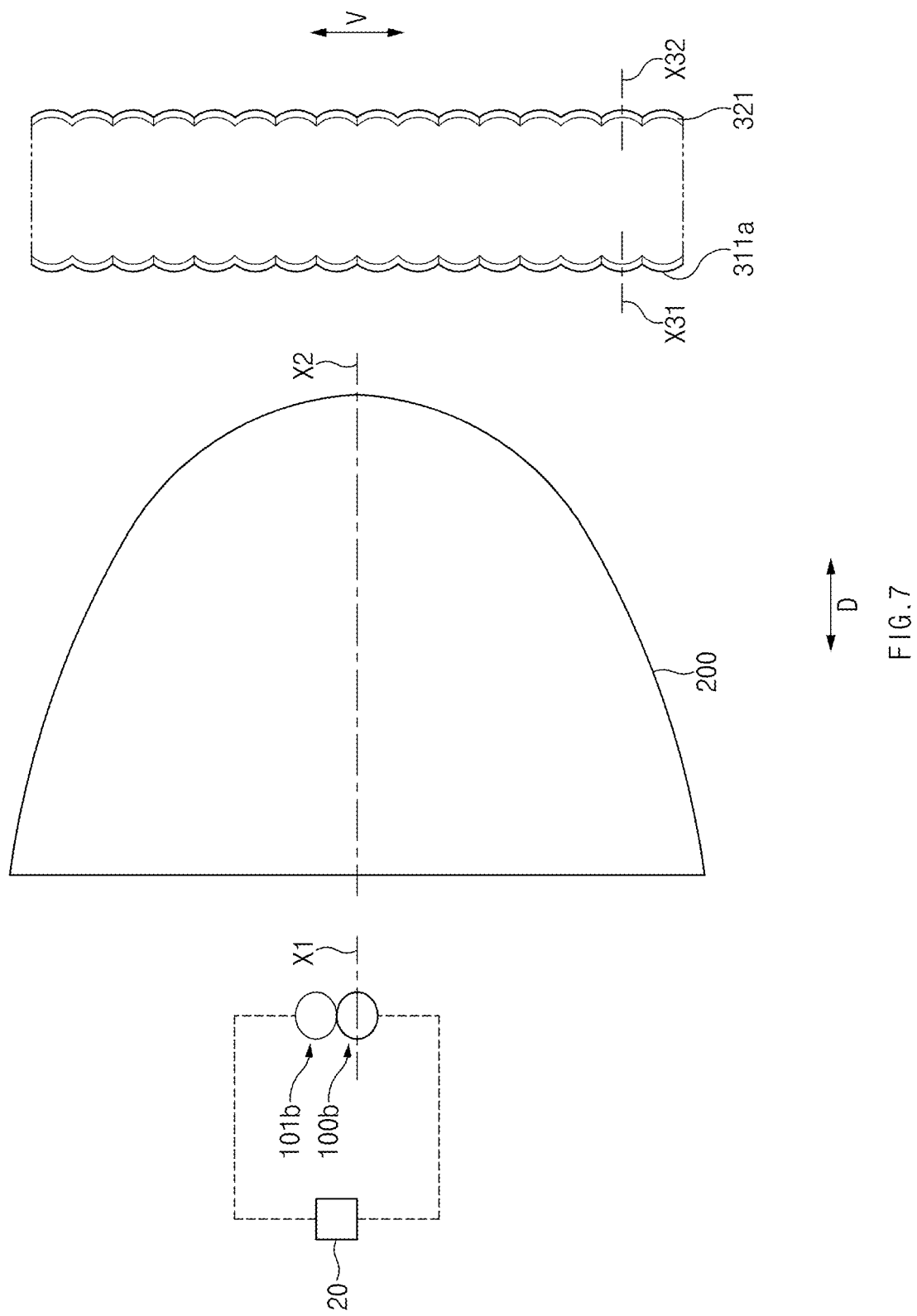
FIG. 7 is a side view of an optical module according to the second embodiment of the present disclosure.

FIG. 5 is a view illustrating a beam segment formed by the optical module 10 according to a first embodiment of the present disclosure. In detail, the beam segment may be formed such that an intensity of light thereof becomes lower as it goes farther from a central portion thereof.

The controller 20 may control lighting of the light source 100a. The controller 20 may be electrically connected to the light source 100a and may be implemented by a processor having a function of decoding and executing commands based on information that is input in advance.

Hereinafter, the lamp 1 according to a second embodiment of the present disclosure will be described with reference to FIGS. 6 to 9. In a description of the lamp 1 according to the second embodiment, differences from the first embodiment of the present disclosure will be mainly described.

The optical module 10 of the lamp 1 according to the second embodiment of the present disclosure may include a plurality of light sources 100b, an auxiliary light source 101b, the collimator 200, and the MLA module 300. Furthermore, a description of the collimator 200 and the MLA module 300 according to the second embodiment is replaced by the description of the collimator 200 and the MLA module 300 according to the first embodiment.

The plurality of light sources 100b may include a central light source 110b, a first peripheral light source 121b, and a second peripheral light source 122b. The central light source 110*b* may define the first optical axis X1. Furthermore, the central light source 110*b* may cross the second optical axis X2. A central light may be output from the central light source 110*b*.

A first peripheral light may be output from the first peripheral light source 121*b*. The first peripheral light source 121*b* may be disposed on one side of the central light source 110*b* in the leftward/rightward direction "W". For example, the first peripheral light source 121*b* may be disposed on a right side of the central light source 110*b*. A plurality of first peripheral light sources 121*b* may be provided. The plurality of first peripheral light sources 121*b* may be arranged along the leftward/rightward direction "W".

In the output lens array 320, the first peripheral light may be output to be inclined to one side of the central light in the leftward/rightward direction "W". For example, when the first peripheral light source 121*b* is disposed on a right side of the central light source 110*b*, the first peripheral light may be output to be inclined to a left side of the central light.

The second peripheral light source 122*b* may output a second peripheral light. The second peripheral light source 122*b* may be disposed on an opposite side of the central light source 110*b* in the leftward/rightward direction "W". For example, the second peripheral light source 122*b* may be disposed on a left side of the central light source 110*b*. The second peripheral light source 122*b* and the first peripheral light source 121*b* may be arranged to be symmetrical to each other with respect to the central light source 110*b*. A plurality of second peripheral light sources 122*b* may be provided. The plurality of second peripheral light sources 122*b* may be arranged in the leftward/rightward direction "W".

The output lens array 320 may output the second peripheral light such that the second peripheral light is inclined to an opposite side of the central light in the leftward/rightward direction "W". For example, when the second peripheral light source 122*b* is disposed on a left side of the central light source 110*b*, the second peripheral light may be output to be inclined to a right side of the central light.

The auxiliary light source 101*b* may be disposed on an upper side of the light source 100*b*. A plurality of auxiliary light sources 101*b* may be provided to correspond to the plurality of light sources 100*b*. For example, the auxiliary light sources 101*b* may include a central auxiliary light source that is disposed on an upper side of the central light source 110*b*, a first peripheral auxiliary light source that is disposed on an upper side of the first peripheral light source 121*b*, and a second peripheral auxiliary light source that is disposed on an upper side of the second peripheral light source 122*b*.

Furthermore, the controller 20 may independently control lightings of the plurality of light sources 100*b* and the plurality of auxiliary light sources 101*b*.

Figure 8:
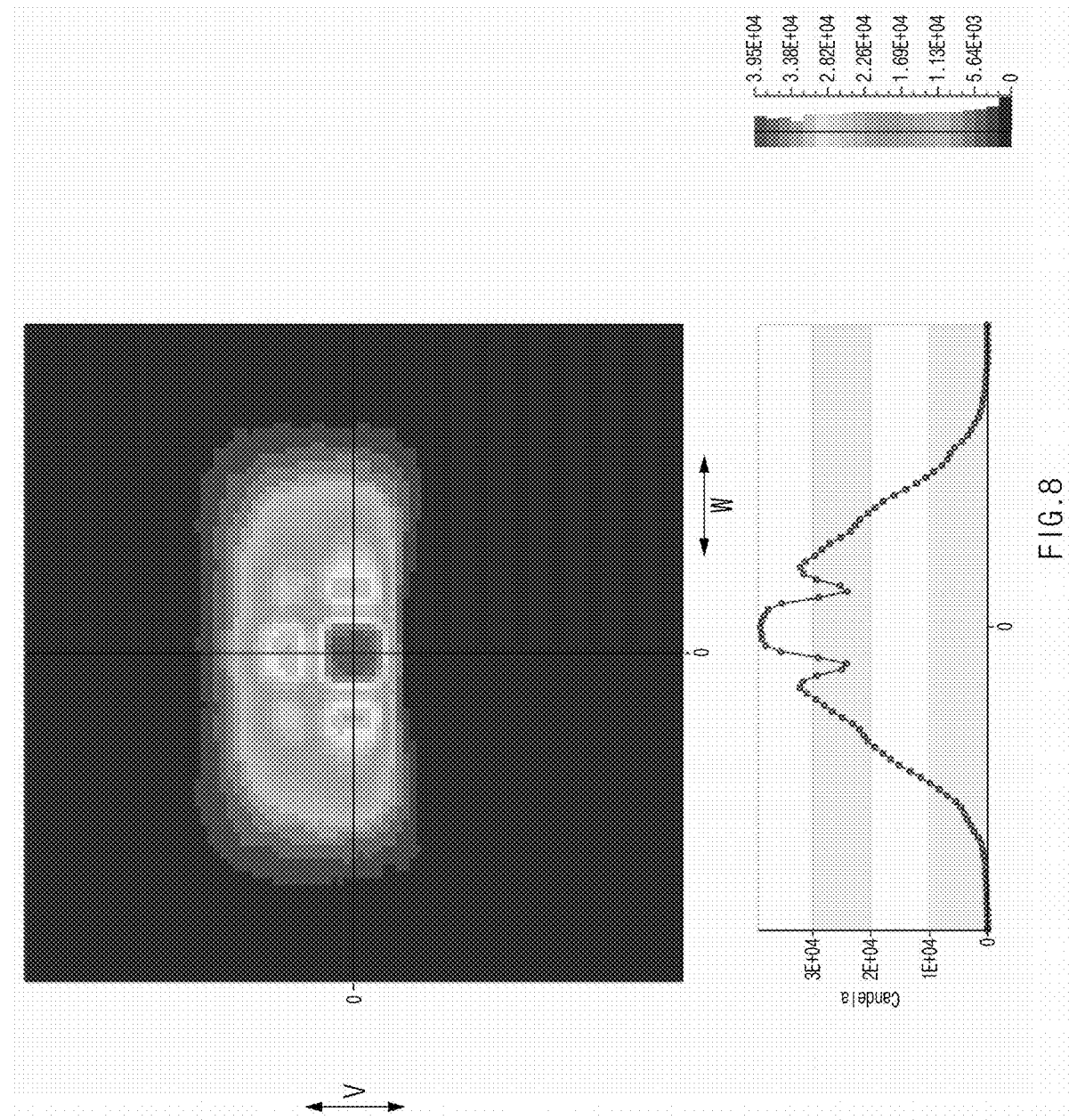
FIG. 8 is a view illustrating a beam pattern defined by a lamp according to the second embodiment of the present disclosure.

FIG. 8 is a view illustrating a beam pattern that is formed by the lamp 1 when the controller 20 turns on all of the central light source 110*b*, two first peripheral light sources 121*b*, two second peripheral light sources 122*b*, the central light source, two first peripheral light sources, and two second peripheral light sources.

Figure 9:
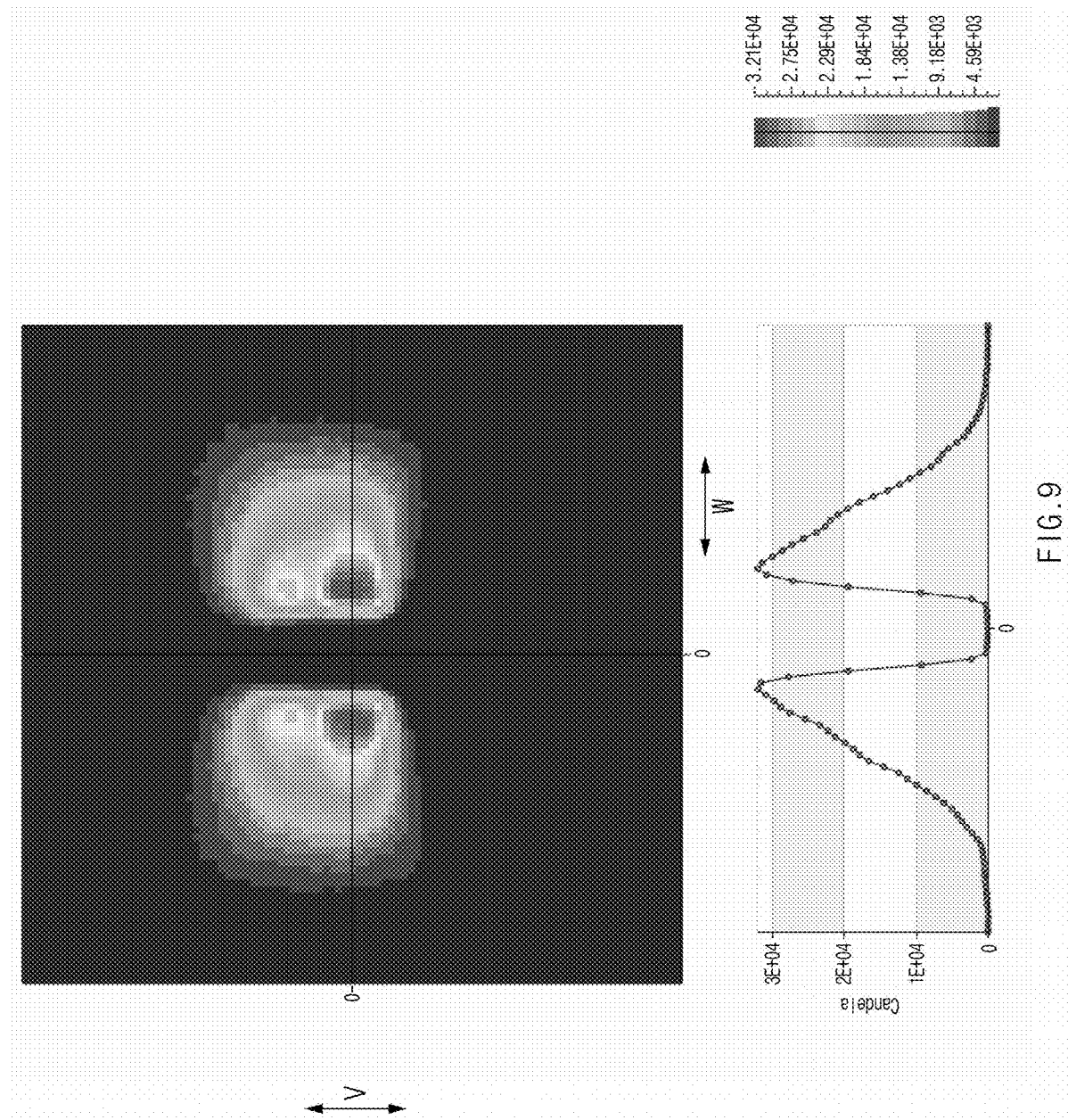
FIG. 9 is a view illustrating, among beam patterns of FIG. 8, a beam pattern in a state, in which no central part is formed.

FIG. 9 is a view illustrating a state, in which the controller 20 turns off the central light source 110*b* and the central auxiliary light source.

Figure 10:
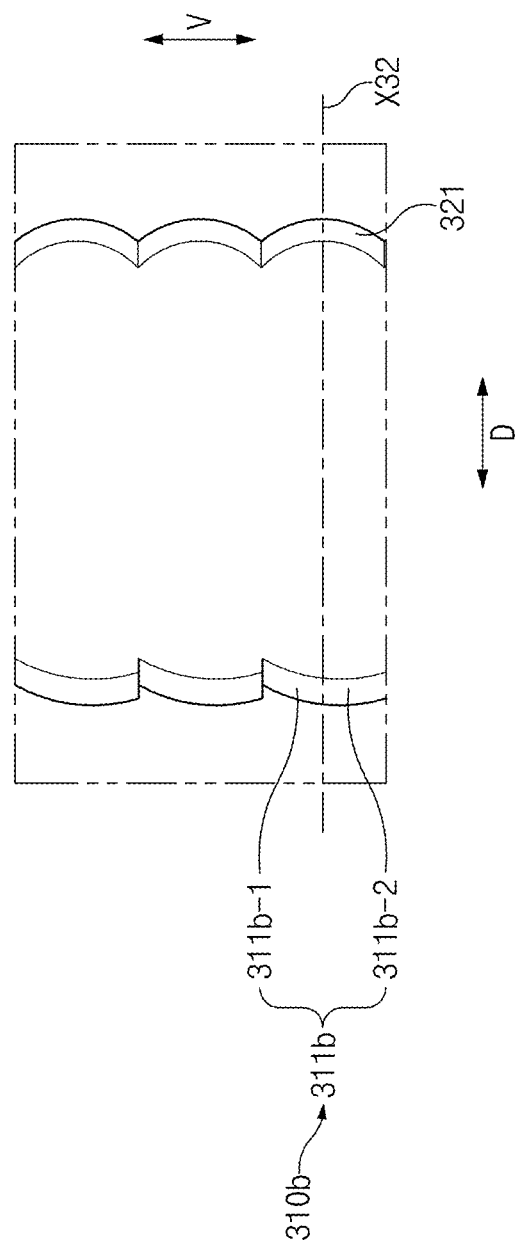
FIG. 10 is an enlarged view of a side surface of an MLA module according to a third embodiment of the present disclosure.

Hereinafter, referring to FIGS. 10 and 11, the lamp 1 according to a third embodiment of the present disclosure will be described. In a description of the lamp 1 according to the third embodiment, differences from the first and second embodiments of the present disclosure will be mainly described.

The optical module 10 included in the lamp 1 according to the third embodiment of the present disclosure may include the light source 100*a*, the collimator 200, and the MLA module 300. Furthermore, the MLA module 300 may include an input lens array 310*b* and the output lens array 320. A description of the light source 100*a*, the collimator 200 and the output lens array 320 according to the third embodiment may be replaced by the description of the light source 100*a*, the collimator 200 and the output lens array 320 according to the first embodiment.

Furthermore, the input lens 311*b* of the input lens array 310*b* may include an upper area 311*b*-1 and a lower area 311*b*-2. Furthermore, a description of the light source 100*a*, the collimator 200 and the output lens array 320 according to the third embodiment is replaced by the description of the light source 100*a*, the collimator 200 and the output lens array 320 according to the first embodiment.

The upper area 311*b*-1 may define an upper side of the input lens 311*b*. The upper area 311*b*-1 may mean an area of the input lens 311*b* that is located on an upper side of an output optical axis X32.

Furthermore, a radius of curvature of any portion of the input lens 311*b* may be the same as a radius of curvature of the output lens 321. For example, a radius of vertical (V) curvature of any portion of the input lens 311*b* may be the same as a radius of vertical (V) curvature of the output lens 321. In a more detailed example, any portion of the input lens 311*b* may mean the upper area 311*b*-1. In other words, a radius of vertical (V) curvature of the upper area 311*b*-1 may be the same as a radius of vertical curvature of the output lens 321.

Among the lights output from the light source 100*a*, a first light may be input to the upper area 311*b*-1. The first light input to the upper area 311*b*-1, as an example, may be output from a lower side of the output lens 321. The lower side of the output lens 321 may mean an area that is located on a lower side of the output optical axis X32. Furthermore, the light output from the lower side of the output lens 321 may be output to a front side.

The lower area 311*b*-2 may define a lower side of the input lens 311*b*. The lower area 311*b*-2 may mean an area of the input lens 311*b*, which is located on a lower side of the output optical axis X32. A radius of vertical curvature of the lower area 311*b*-2 may be different from a radius of vertical curvature of the output lens 321.

For example, the radius of vertical (V) curvature of the lower area 311*b*-2 may be larger than the radius of vertical (V) curvature of the output lens 321. In other words, the radius of vertical curvature of the lower area 311*b*-2 may be larger than the radius of vertical curvature of the upper area 311*b*-1.

Among the lights output from the light source 100*a*, a second light may be input to the lower area 311*b*-2. The second light input to the lower area 311*b*-2 may be output from an upper side of the output lens 321.

When the second light is output from the output lens array 320, it may be output to be inclined upwards with respect to the first light. For example, the first light output from the output lens array 320 travels forwards, the second light output from the output lens array 320 may travel forwards and upwards.

Figure 11:
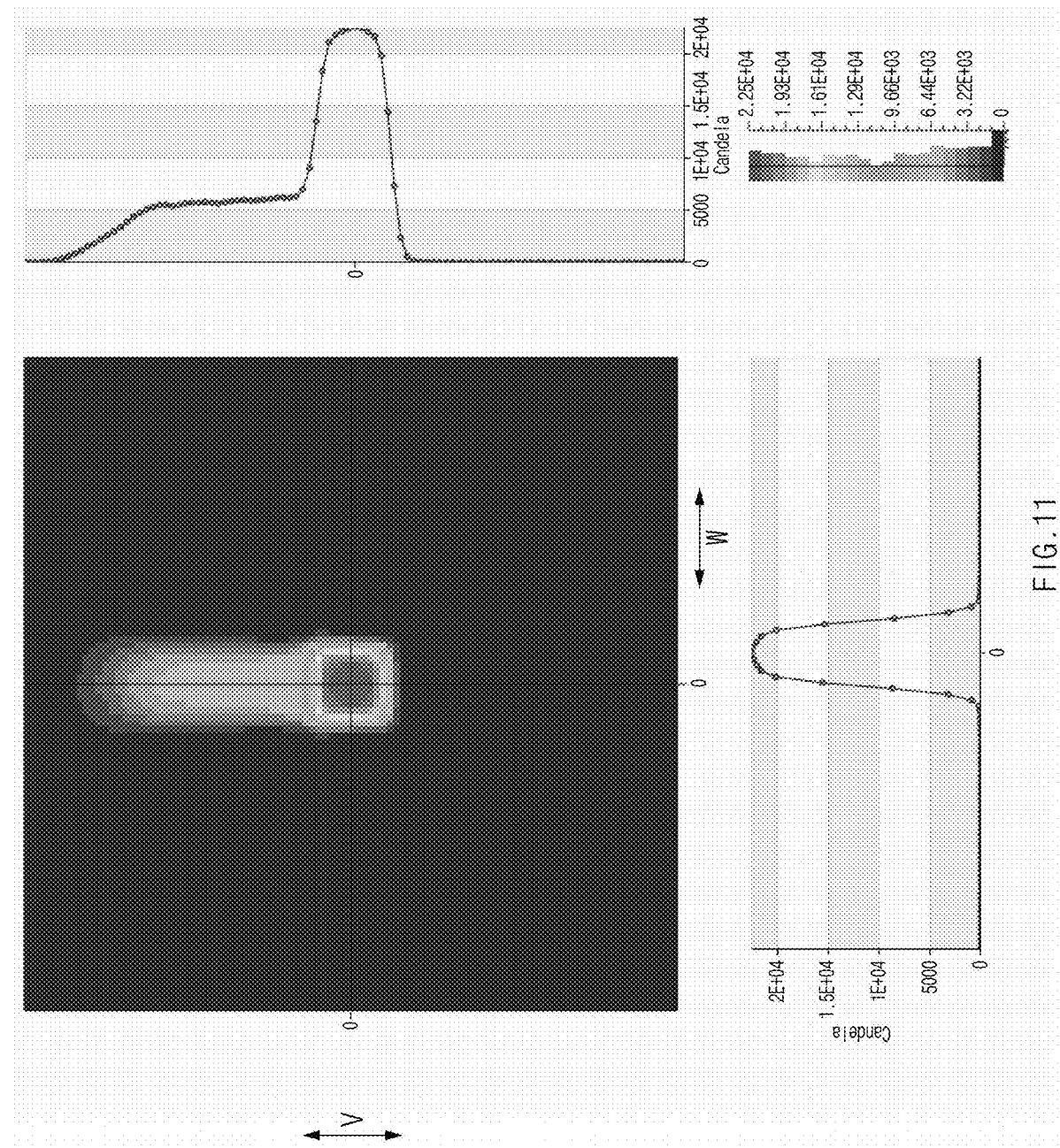
FIG. 11 is a view illustrating a beam segment formed by an optical module according to the third embodiment of the present disclosure.

FIG. 11 is a view illustrating a beam segment formed by the lamp 1 according to a third embodiment. Furthermore, the beam segment includes a central beam and an upper beam. The upper beam may be a beam that extends upwards from the central beam. The upper beam may be formed according to a shape of the lower area 311b-2.

Figure 12:
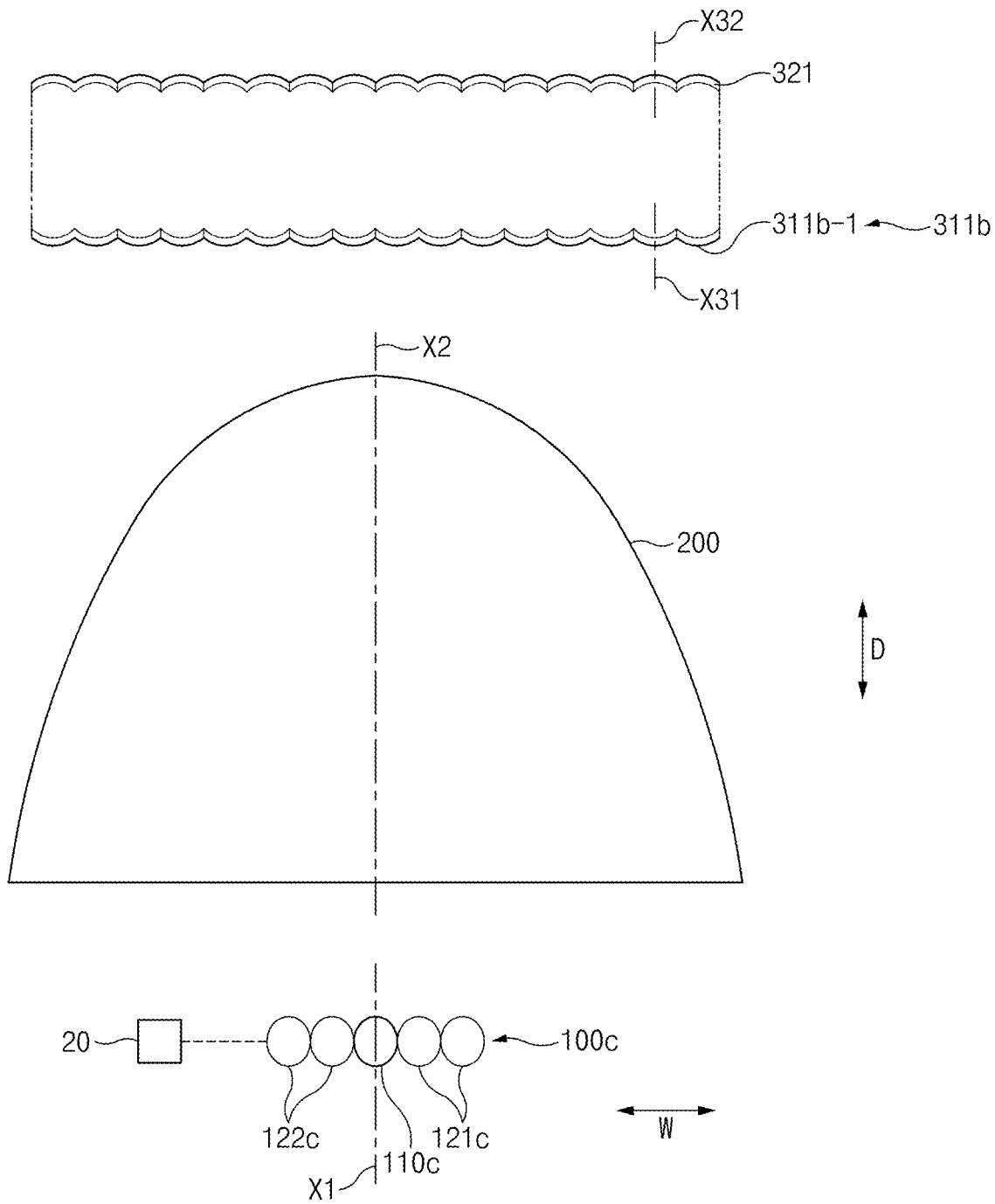
FIG. 12 is a plan view of an optical module according to a fourth embodiment of the present disclosure.

Hereinafter, referring to FIGS. 12 and 13, the lamp 1 according to a fourth embodiment of the present disclosure will described. In a description of the lamp 1 according to the fourth embodiment, differences from the first embodiment, the second embodiment, and the third embodiment of the present disclosure will be mainly described.

The optical module 10 included in the lamp 1 according to the fourth embodiment of the present disclosure may include a plurality of light sources 100c, the collimator 200, and the MLA module 300. Furthermore, the MLA module 300 according to the fourth embodiment may include the input lens array 310b and the output lens array 320. A description of the light source 100c according to the fourth embodiment is replaced by the description of the light source 100b according to the third embodiment. Furthermore, a description of the collimator 200, the input lens array 310b, and the output lens array 320 according to the third embodiment is replaced by the description of the input lens array 310b according to the third embodiment.

The plurality of light sources 100c may include a central light source 110c, a first peripheral light source 121c, and a second peripheral light source 122c. Contents of the central light source 110c, the first peripheral light source 121c, and the second peripheral light source 122c are replaced by contents of the central light source 110b, the first peripheral light source 121b, and the second peripheral light source 122b according to the second embodiment.

Furthermore, the central light source 110c, the first peripheral light source 121c, and the second peripheral light source 122c may form an upper beam of the beam pattern through the lower area 311b-2.

Figure 13:
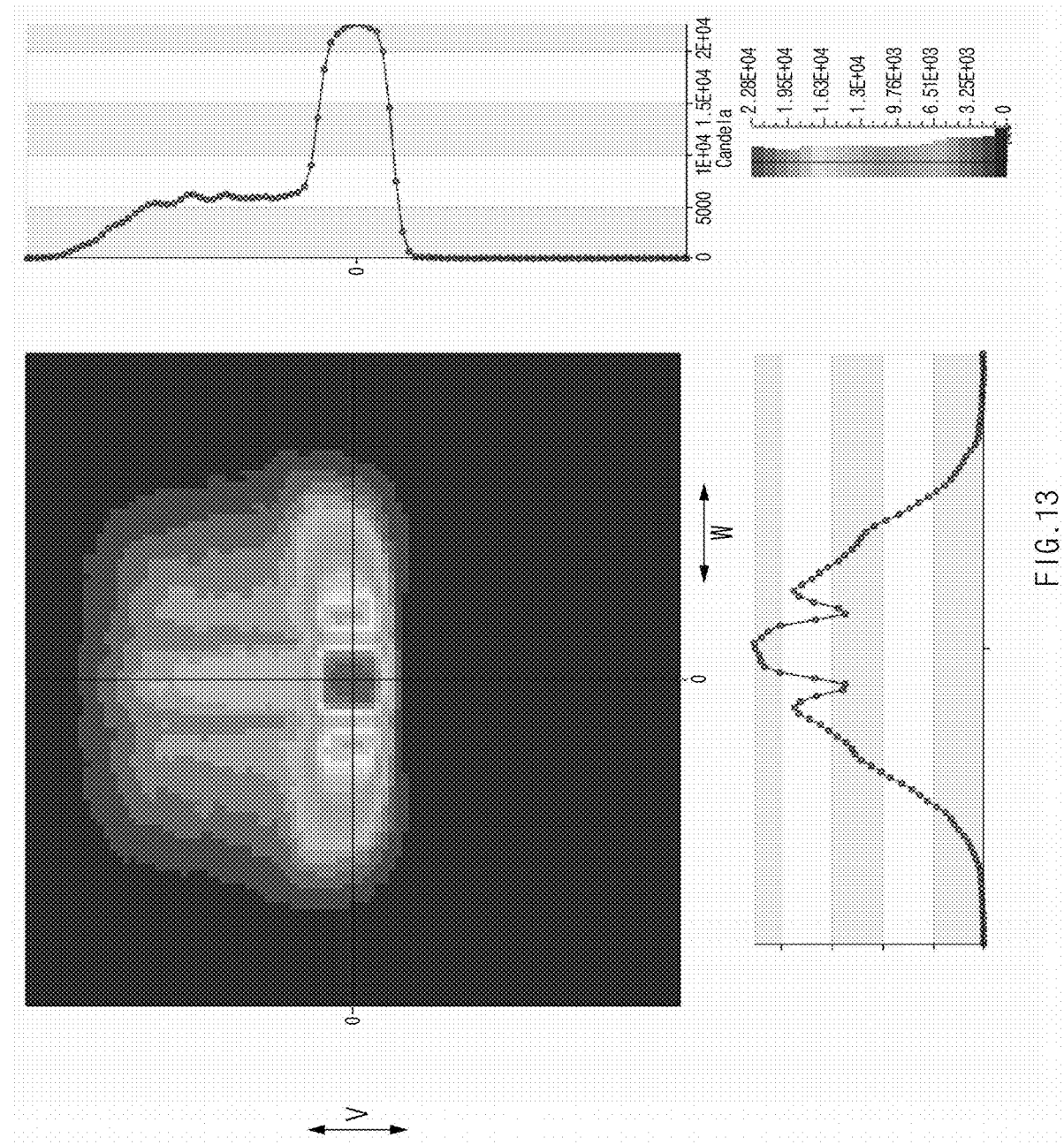
FIG. 13 is a view illustrating a beam pattern defined by a lamp according to the fourth embodiment of the present disclosure.

FIG. 13 is a view illustrating a beam pattern that is formed by the lamp 1 when the controller 20 turns on all of the central light source 110c, the first peripheral light source 121c, and the second peripheral light source 122c.

Figure 14:
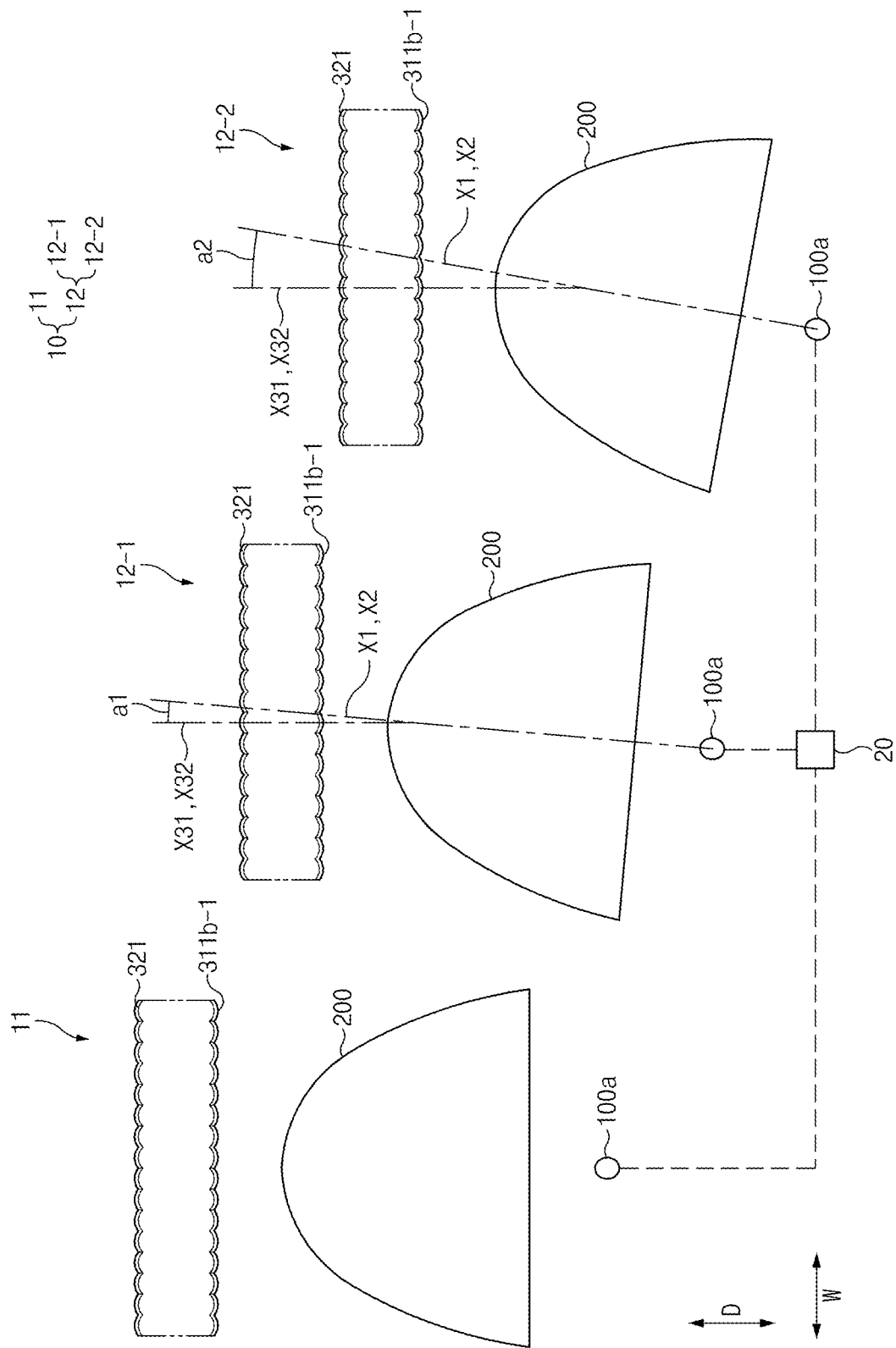
FIG. 14 is a plan view of a first optical module, a (2-1)-th optical module, and a (2-2)-th optical module according to a fifth embodiment of the present disclosure.

Hereinafter, referring to FIGS. 14 to 16, the lamp 1 according to a fifth embodiment of the present disclosure will be described. In a description of the lamp 1 according to the fifth embodiment, differences from the first embodiment, the second embodiment, the third embodiment, and the fourth embodiment of the present disclosure will be mainly described.

A plurality of optical modules 10 may be provided to the lamp 1 according to the fifth embodiment of the present disclosure. The plurality of optical modules 10 may include a first optical module 11 and a second optical module 12. The first optical module 11 according to the fifth embodiment may include the light source 100a, the collimator 200, and the MLA module 300. A description of the light source 100a, the collimator 200, and the MLA module 300 of the first optical module 11 is replaced by the description of the light source 100a, the collimator 200, and the MLA module 300 according to the third embodiment.

The second optical module 12 may include the light source 100a, the collimator 200, and the MLA module 300. A description of the MLA module 300 of the second optical module 12 is replaced by the description of the MLA module 300 according to the third embodiment.

The first optical axis X1 and the second optical axis X2 of the second optical module 12 may coincide with each other. Furthermore, the first optical axis X1 and the output optical axis X32 of the second optical module 12 may not parallel to each other. For example, when the second optical module 12 is viewed in the vertical direction "V", the first optical axis X1 and the output optical axis X32 may be oriented not be parallel to each other. In other words, when the second optical module 12 is viewed in the vertical direction "V", an imaginary line that extends along the first optical axis X1 and an imaginary line that extends along the output optical axis X32 may cross at one point.

The second optical module 12 may be disposed on a rear side of a front end of the first optical module 11. Furthermore, the second optical module 12 may be disposed on one side of the first optical module 11 in the leftward/rightward direction "W". For example, referring to FIGS. 14 and 15, the second optical module 12 of a right lamp that is the lamp 1 provided on a right side of the vehicle may be disposed on a right side of the first optical module 11. The right lamp may define a left area of the beam pattern. Furthermore, FIG. 14 is a view illustrating an appearance of the right lamp.

However, the present disclosure is not limited the example, and although not illustrated in the drawings, the second optical module of a left lamp that is a lamp provided on a left side of the vehicle may be disposed on a left side of the first optical module. Furthermore, the left lamp may define a right area of the beam pattern.

Hereinafter, a description will be made with reference to when the second optical module 12 is provided in the right lamp. Referring back to FIG. 14, the second optical module 12 may include a (2-1)-th optical module 12-1 and a (2-2)-th optical module 12-2.

The first optical axis X1 and the output optical axis X32 of the (2-1)-th optical module 12-1 may define a first angle a1. The output optical axis X32 of the (2-1)-th optical module 12-1 may extend in the forward/rearward direction, and the first optical axis X1 of the (2-1)-th optical module 12-1 may extend to be inclined to a right side with respect to the forward/rearward direction. Furthermore, with respect to the leftward/rightward direction "W", the (2-1)-th optical module 12-1 may be disposed between the first optical module 11 and the (2-2)-th optical module 12-2.

The first optical axis X1 and the output optical axis X32 of the (2-2)-th optical module 12-2 may define a second angle a2. The output optical axis X32 of the (2-2)-th optical module 12-2 may extend in the forward/rearward direction, and the first optical axis X1 of the (2-2)-th optical module 12-2 may extend to be inclined rightwards with respect to the forward/rearward direction. Furthermore, the second angle a2 may be larger than the first angle a1. In other words, a degree, by which the first optical axis X1 of the (2-2)-th optical module 12-2 is inclined rightwards with respect to the forward/rearward direction, may be larger than a degree, by which the first optical axis X1 of the (2-1)-th optical module 12-1 is inclined rightwards with respect to the forward/rearward direction.

Furthermore, the first optical module 11, the (2-1)-th optical module 12-1, and the (2-2)-th optical module 12-2 may be sequentially arranged along the rightward direction. Furthermore, beam segments that are formed by the first optical module 11, the (2-1)-th optical module 12-1, and the (2-2)-th optical module 12-2, respectively, may be named a central segment, a first peripheral segment, and a second peripheral segment.

Figure 15:
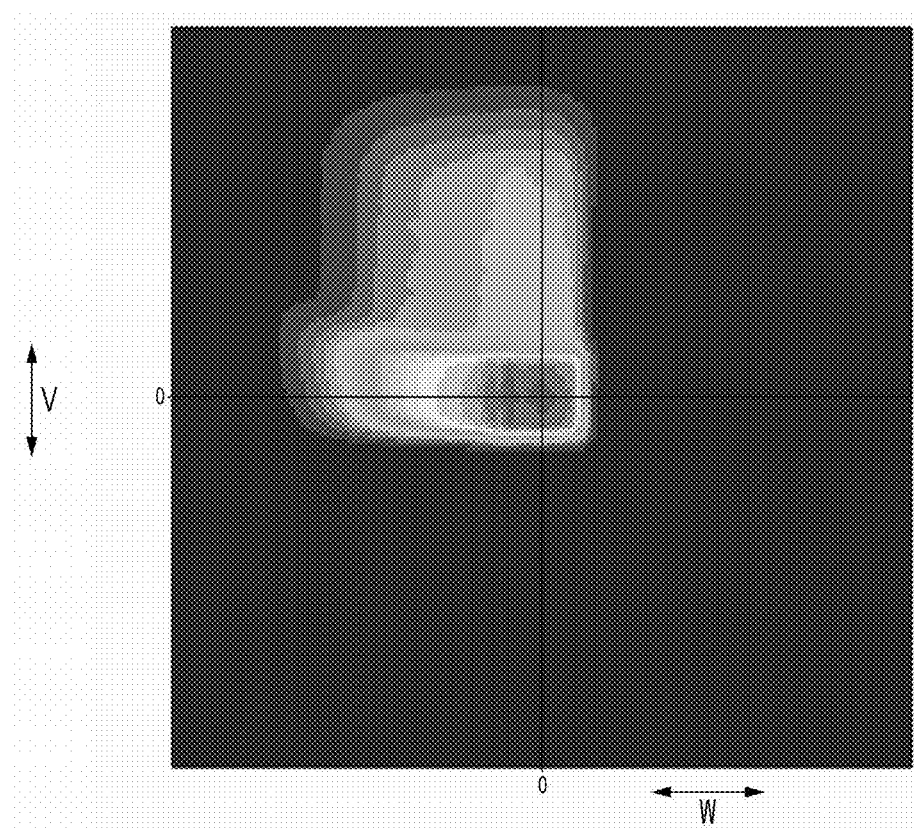
FIG. 15 is a view illustrating a beam pattern formed by, among lamps according to the fifth embodiment of the present disclosure, a lamp provided on a right side of a vehicle.

FIG. 15 is a view illustrating a beam pattern that is formed by the right lamp when the controller 20 turns on all of the light source 100a of the first optical module 11, the light source 100a of the (2-1)-th optical module 12-1, and the light source 100a of the (2-2)-th optical module 12-2. In other words, FIG. 15 is a view illustrating a beam pattern when all of the central segment, the first peripheral segment, and the second peripheral segment are formed.

Figure 16:
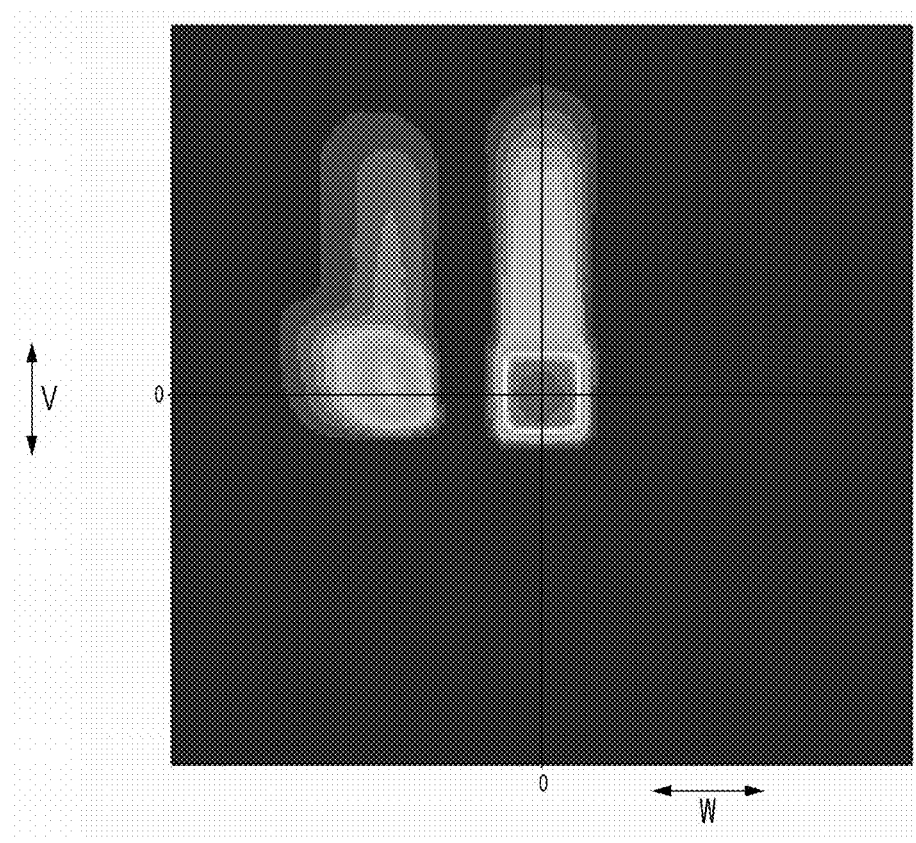
FIG. 16 is a view illustrating, among beam patterns of FIG. 15, a beam pattern, in which no first peripheral segment is formed.

FIG. 16 is a view illustrating a beam pattern that is formed by the right lamp when the controller 20 turns on the light source 100a of the first optical module 11 and the light source 100a of the (2-2)-th optical module 12-2 and turns off the light source 100a of the (2-1)-th optical module 12-1. In other words, FIG. 16 is a view illustrating a beam pattern when the central segment and the second peripheral segment are formed and the first peripheral segment is not formed.

The optical module according to the present disclosure includes a micro lens array that may implement an adaptive driving beam (ADB) without separately including a shield whereby a problem of a process of manufacturing the micro lens array and a manufacturing scheme thereof being complex may be solved.

Although it may have been described until now that all the components constituting the embodiments of the present disclosure are coupled to one or coupled to be operated, the present disclosure is not essentially limited to the embodiments. That is, without departing from the purpose of the present disclosure, all the components may be selectively coupled into one or more components to be operated. Furthermore, because the terms, such as "comprising", "including", or "having" may mean that the corresponding component may be included unless there is a specially contradictory description, it should be construed that another component is not extruded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the embodiments of the present disclosure but provided to describe the present disclosure, and the scope of the technical spirits of the present disclosure is not limited by the embodiments. Accordingly, the genuine technical scope of the present disclosure should be construed by the attached claims, and all the technical spirits within the equivalent ranges fall within the scope of the present disclosure.

What is claimed is:

1. A plurality of optical modules, each optical module comprising:
    a light source configured to output light; and
    a micro lens array (MLA) module on a front side of the light source positioned to receive the light,
    wherein the MLA module includes:
    an input lens array through which the light is input, the input lens array including a plurality of input lenses; and
    an output lens array provided on a front side of the input lens array and configured to output the light received through the input lens array, the output lens array including a plurality of output lenses,
    wherein optical axes of all of the plurality of output lenses in the output lens array extend in a forward/rearward direction and cross respective centers of the plurality of input lenses;
    the input lenses have shapes that are convex in a rearward direction,
    the output lenses have shapes that are convex in a forward direction; and
    the input lenses have upper portions and lower portions, and
    radii of vertical curvatures of lower portions of the input lenses are larger than radii of vertical curvatures of the output lenses, and
    radii of vertical curvatures of upper portions of the input lenses are the same as radii of vertical curvatures of the output lenses, and
    a collimator configured to convert the light output from the light source to parallel light, the collimator being disposed between the light source and the MLA module with respect to the forward/rearward direction, and
    wherein the direction in which the collimators are arranged is different for each of the optical modules of the plurality of optical modules.

2. The optical modules of claim 1, wherein:
    among light output from the light source, light input to the upper portions of the input lenses is defined as first light and light input to the lower portions of the input lenses is defined as second light, and
    the second light is output from the output lens array to be inclined upwards with respect to the first light.

3. The optical modules of claim 1, wherein an optical axis of the collimator and an optical axis of the light source coincide with each other.

4. A plurality of optical modules, each optical module comprising:
    a light source configured to output light; and
    a micro lens array (MLA) module on a front side of the light source positioned to receive the light,
    wherein the MLA module includes:
    an input lens array through which the light is input, the input lens array including a plurality of input lenses;
    an output lens array provided on a front side of the input lens array and configured to output the light received through the input lens array, the output lens array including a plurality of output lenses; and
    a collimator configured to convert the light output from the light source to parallel light, the collimator being disposed between the light source and the MLA module with respect to a forward/rearward direction;
    wherein optical axes of all of the plurality of output lenses in the output lens array extend in a forward/rearward direction and cross respective centers of the plurality of input lenses,
    wherein the light source comprises a plurality of individual light sources, and
    the plurality of light sources includes:
    a central light source with an axis crossing an optical axis of the collimator and from which a central light is output;
    a first peripheral light source that is disposed on one side of the central light source in a leftward/rightward direction and from which a first peripheral light is output; and
    a second peripheral light source that is disposed on an opposite side of the central light source in the leftward/rightward direction and from which a second peripheral light is output; and wherein the output lens array is configured to:
output the first peripheral light such that the first peripheral light is inclined to one side in the leftward/rightward direction with respect to the central light; and
output the second peripheral light such that the second peripheral light is inclined to an opposite side in the leftward/rightward direction with respect to the central light, and
radii of vertical curvatures of lower portions of the input lenses are larger than radii of vertical curvatures of the output lenses, and
radii of vertical curvatures of upper portions of the input lenses are the same as radii of vertical curvatures of the output lenses and
wherein the direction in which the collimators are arranged is different for each of the multiple optical modules of the plurality of optical modules.

5. The optical module of claim 4, wherein the MLA comprising the input lens array and output lens array is one unitary molding.

6. A lamp for a vehicle, comprising
a plurality of optical modules,
wherein each of the optical modules includes:
a light source configured to output light; and
a micro lens array (MLA) module provided on a front side of the light source to receive the light,
wherein, within each optical module, the MLA module includes:
an input lens array through which the light is input, the input lens array including a plurality of input lenses; and
an output lens array that is provided on a front side of the input lens array and configured to output the light received through the input lens array, the output lens array including a plurality of output lenses,
wherein optical axes of all of the plurality of output lenses of the output lens array extend in a forward/rearward direction and cross through respective centers of the plurality of input lenses, and
the lamp further comprises:
a first optical module of the plurality of optical modules in which
optical axes of the plurality of output lenses coincide with an optical axis of the light source of the first optical module, and
a second optical module of the plurality of optical modules in which
optical axes of the plurality of output lenses are not parallel to the optical axis of the light source of the second optical module, and
radii of vertical curvatures of lower portions of the input lenses are larger than radii of vertical curvatures of the output lenses, and
radii of vertical curvatures of upper portions of the input lenses are the same as radii of vertical curvatures of the output lenses and
a collimator configured to convert the light output from the light source to parallel light, the collimator being disposed between the light source and the MLA module with respect to the forward/rearward direction, and
the direction in which the respective collimators are arranged is different for each of the optical modules.

7. The optical module of claim 6, wherein the input lenses and output lenses are aspheric lenses.

* * * * *